(12) United States Patent
Mironets et al.

(10) Patent No.: US 11,084,092 B2
(45) Date of Patent: Aug. 10, 2021

(54) COMPONENTS HAVING LOW ASPECT RATIO

(71) Applicant: Hamilton Sundstrand Corporation, Charlotte, NC (US)

(72) Inventors: Sergey Mironets, Szymanow (PL); William Louis Wentland, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/665,079

(22) Filed: Oct. 28, 2019

(65) Prior Publication Data
US 2020/0130058 A1   Apr. 30, 2020

(30) Foreign Application Priority Data
Oct. 27, 2018  (EP) ...................................... 18461620

(51) Int. Cl.
| | | |
|---|---|---|
| *B22F 3/14* | (2006.01) | |
| *B33Y 80/00* | (2015.01) | |
| *B33Y 10/00* | (2015.01) | |
| *B22F 5/08* | (2006.01) | |
| *B22F 10/20* | (2021.01) | |

(52) U.S. Cl.
CPC .................. *B22F 3/14* (2013.01); *B22F 5/08* (2013.01); *B22F 10/20* (2021.01); *B33Y 10/00* (2014.12); *B33Y 80/00* (2014.12)

(58) Field of Classification Search
CPC .... B22F 2998/10; B22F 3/105; B22F 3/1055; B22F 3/02; B22F 3/10; B22F 3/14; B22F 5/08; B30B 11/027; B33Y 10/00; B33Y 40/00; B33Y 80/00
See application file for complete search history.

(56) References Cited

U.S. PATENT DOCUMENTS 6,187,087 B1 * 2/2001 Yoo ............................ B01J 3/06
117/7
9,186,726 B2   11/2015 Keane et al.
(Continued)

FOREIGN PATENT DOCUMENTS

EP         3315227 A1    5/2018
EP         3315227 A1    5/2018
(Continued)

OTHER PUBLICATIONS

Effect of Powder Type and Compaction Pressure on the Density, Hardness and Oxidation Resistance of Sintered and Steam-treated Steels Wan-Fung Wang Journal of Materials Engineering and Performance vol. 16(5) Oct. 2007 (Year: 2007).*

(Continued)

*Primary Examiner* — Jenny R Wu
(74) *Attorney, Agent, or Firm* — Cantor Colburn LLP

(57) ABSTRACT

A method of manufacturing a component includes making a preform from a powdered material, the preform having a density in a range from 70 to 95% of theoretical density of the material, The method also includes sintering the preform using a Field Assisted Sintering Technique (FAST) process to produce a component having a density of greater than 97% of the theoretical density of the material. Components, in particular low aspect components, formed by said method are also described.

11 Claims, 5 Drawing Sheets

(56) References Cited

U.S. PATENT DOCUMENTS

2018/0111191 A1* 4/2018 Mironets .............. B22F 1/0003
2018/0133789 A1   5/2018 Martin
2020/0114427 A1* 4/2020 Karuppoor ........... B29C 64/188

FOREIGN PATENT DOCUMENTS

JP   H1171602 A    3/1999
WO   2011072961 A1 6/2011

OTHER PUBLICATIONS

Extended European Search Report for International Application No. 18461620.9 dated May 6, 2019, 8 pages.

* cited by examiner

US 11,084,092 B2

COMPONENTS HAVING LOW ASPECT RATIO

FOREIGN PRIORITY

This application claims priority to European Patent Application No. 18461620.9 filed Oct. 27, 2018, the entire contents of which is incorporated herein by reference.

FIELD

The present disclosure relates to the manufacture of components having a low aspect ratio. In particular, the method relates to components that are manufactured by a combination of an additive manufacture/powder metallurgy process and field assisted sintering techniques.

BACKGROUND

Additive manufacturing and powder metallurgy processes have become a popular way of producing one-off ("prototype") parts, in particular components which have a complex geometry. Problems can be encountered when trying to apply additive manufacturing/powder metallurgy techniques to create mass produced items or components for high performance operations. Process capability uncertainty and process variation of such additive manufacturing/powder metallurgy processes are one of the main obstacles in transitioning from prototyping to production for aerospace parts designed for demanding applications.

A common problem with materials produced by means of current additive manufacturing (AM) and powder metallurgy (PM) processes is that they typically have wider scatter in terms of mechanical properties than wrought alloys. This may be because of higher levels of impurities, coarser grain size in the crystalline structure of the formed, metallic material, and directionality of grain morphology. These factors affect fatigue and fracture toughness properties that are crucial for aerospace parts.

To try to resolve these problems, it is known to apply a thermo-mechanical treatment such as Hot Isostatic Pressing (HIP) or forging to the as-built materials (e.g., preforms). HIP is commonly used for AM/PM parts not only for healing the internal defects but also for grain recrystallization. Forging of AM/PM parts is also gaining momentum in the aerospace industry.

One reason for incorporating a forging process in the production of AM parts is to enhance the properties of the three dimensional components printed by AM. These enhanced properties can include toughness, fatigue and strength, as compared with components that are made solely by AM. The main weaknesses of a process that combines AM with forging are:

1. There can be limited part complexity due to forging tooling design capability. This can also result in the part shape formed from AM requiring extensive machining operations to achieve the final part dimensions.

2. The resulting microstructure of the formed part tends to be non-isotropic because of grain directionality (the grains elongate in the forging flow direction). This non-uniformity affects the material and/or mechanical properties of the formed part.

SUMMARY

According to a first aspect, the present disclosure can be seen to provide a method of manufacturing a component comprising: making a preform from a powdered material, the preform having a density in a range from 70 to 95% of theoretical density of the material; and sintering the preform using a Field Assisted Sintering Technique (FAST) process to produce a component having a density of greater than 97% of the theoretical density of the material.

In addition to the features described above, the preform may be manufactured by additive manufacturing.

In addition to one or more of the features described above, or as an alternative, the preform may be manufactured by a laser bed fabrication process.

In addition to one or more of the features described above, or as an alternative, the preform may be manufactured by powder metallurgy.

In addition to one or more of the features described above, or as an alternative, the preform may be manufactured by low temperature consolidation or gravity sintering.

In addition to one or more of the features described above, or as an alternative, the FAST process may comprise applying an electric potential across the preform via opposed conductive dies which are arranged to apply pressure simultaneously in order to consolidate the preform.

In addition to one or more of the features described above, or as an alternative, the dies for the FAST process may be configured to produce a component with a machining allowance of 2% or less.

In addition to one or more of the features described above, or as an alternative, the dies may each comprise a die surface and at least one of the die surfaces may be profiled so as to vary in height across the die surface and thereby provide a die cavity defined by a first die separation and a second die separation different to the first die separation, and wherein the preform may be made with a first portion having a first density in the first die separation of the die cavity prior to the FAST process and a second portion having a second density different to the first density in the second die separation of the die cavity prior to the FAST process.

In addition to one or more of the features described above, or as an alternative, the die cavity may be further defined by a third die separation which is different to the second die separation, and the preform may be made with a third portion having a third density which is different to the second density prior to the FAST process.

In addition to one or more of the features described above, or as an alternative, the third die separation may be the same as the first die separation (±3%) and the third density may be the same as the first density (±3%) prior to the FAST process.

In addition to one or more of the features described above, or as an alternative, the first die separation may be taller than the second die separation and the preform may be made with a first portion having a higher density than the second portion prior to the FAST process.

In addition to one or more of the features described above, or as an alternative, the third die separation may be taller than the second die separation and the preform may be made with a third density which is a higher density than the second portion prior to the FAST process.

In addition to one or more of the features described above, or as an alternative, the component may comprise a rotational part.

In addition to one or more of the features described above, or as an alternative, the component may comprise a gear, having a hub which is formed in the first die separation, and a web which is formed in the second die separation, and optionally a rim which is formed in a third die separation.

In addition to one or more of the features described above, or as an alternative, the component may be for an aerospace application, having an aspect ratio of 0.5 or less, where the aspect ratio is defined as a height of the component (H) divided by its diameter (D), the height being measured perpendicular to the diameter.

In addition to one or more of the features described above, or as an alternative, the aspect ratio may be 0.25 or less.

In addition to one or more of the features described above, or as an alternative, the FAST process may be conducted until the component has reached a density of at least 99% of theoretical density for the material.

In addition to one or more of the features described above, or as an alternative, the preform may be made from a powdered metal material.

In addition to one or more of the features described above, or as an alternative, the preform may be made of a weldable metal material.

In addition to one or more of the features described above, or as an alternative, the preform may be made from low temperature consolidation without lubricants in a rigid die.

In addition to one or more of the features described above, or as an alternative, the preform may be made from gravity sintering in ceramic or graphite moulds.

In addition to one or more of the features described above, or as an alternative, the preform may be made by a laser bed fabrication process and parameters of a laser bed apparatus may be altered as the laser moves across the powdered material to sinter the powdered material to different densities.

In addition to one or more of the features described above, or as an alternative, the powdered material may comprise powder having a non-spherical morphology.

In addition to one or more of the features described above, or as an alternative, the powdered material may not comprise a lubricant.

In addition to one or more of the features described above, or as an alternative, the method may be a method of manufacturing a gear, optionally selected from the group comprising wheel gears, planet gears, bevel gears, ring and flanged ring gears.

According to a second aspect of the disclosure, there is provided a low aspect component of net shape or near net shape which has been made from sintering a powdered material having a final sintered density of greater than 97% of theoretical density of the material, a uniform distribution of porosity and precipitates (up to ±2% variation) and a uniform variation of grain size across the component (up to ±2% variation).

BRIEF DESCRIPTION OF FIGURES

Certain embodiments will now be described in greater detail by way of example only and with reference to the accompanying figures in which.

DESCRIPTION

Figure 1:
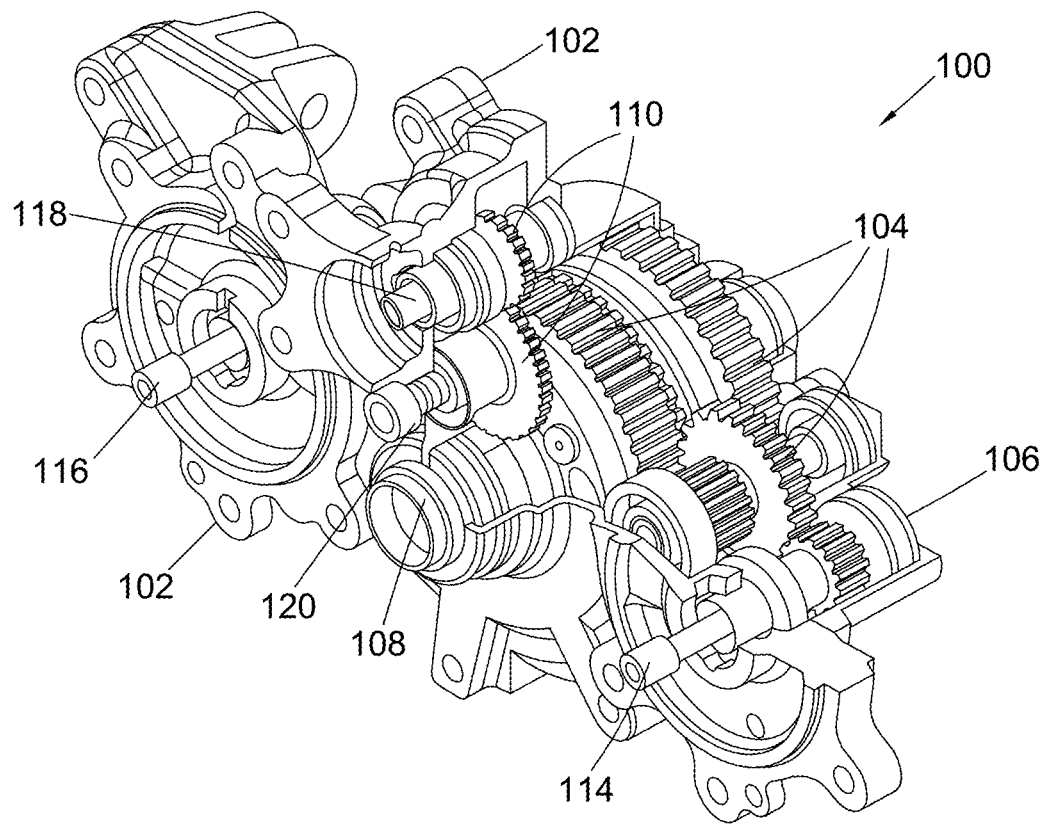
FIG. 1 is a perspective view of an exemplary gearbox with a portion of the casing removed to show an exemplary arrangement of internal gears.

FIG. 1 is a perspective view of an exemplary gearbox 100. The gearbox 100 comprises a casing 102 containing a plurality of gears 104. The gearbox 100 may comprise an assortment of gears 104, such as wheel gears, planet gears, bevel gears, ring and flanged ring gears, etc., the number and arrangement of which is dependent on the design of the gearbox 100. The gears 104 are coupled together for rotation to transmit torque from an input shaft 106 through the gearbox 100 to an output shaft 108.

The gearbox 100 may also include additional gears 110 to transmit a rotational output to a sensor (sensor not shown) for monitoring the operation of the gearbox 100.

Quill shafts 114, 116 may be provided to couple torque and rotational velocity from a drive input, e.g. from a motor (motor not shown), into the input shaft 106 of the gearbox 100, and to take off the resulting torque and rotational velocity as modified by the gearbox 100 from the output shaft 108, respectively.

A further quill shaft 118 may be provided to take off the rotational output to the sensor (sensor not shown).

The gears 104, 110 may be mounted on gear shafts 120 for rotation within the casing 102.

Figure 2:
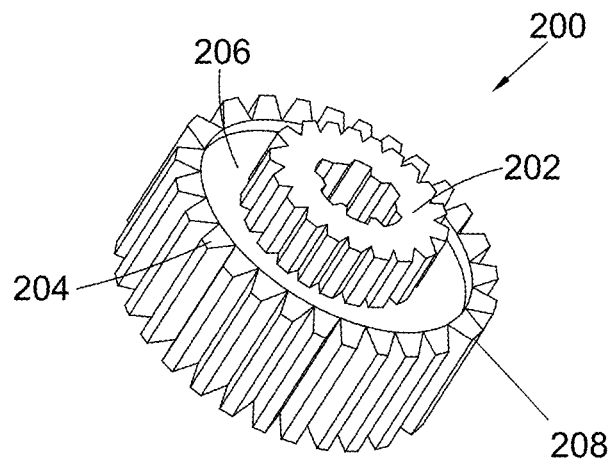
FIG. 2 is perspective view of an exemplary gear.

FIG. 2 shows a perspective view of an exemplary gear 200. The gear 200 has an axis of rotation and comprises a hub 202, a rim 204 and a radially extending web 206 connecting the rim 204 to the hub 202. The hub 202 and rim 204 are generally thicker in cross-section than the web 206, i.e., in an axial direction. At the rim 204, the gear 200 is provided with gear teeth 208. These may be externally arranged gear teeth 208 as shown, or may be arranged internally or even as teeth which extend axially, depending on the gear arrangement. The gear teeth 208 may be arranged for engagement with axially extending teeth, for engagement with teeth extending in a helical path with an axial component, or may comprise a bevel arrangement or indeed any other gear tooth arrangement.

Gears 104, 110; 200 are examples of rotational parts that are used in demanding conditions. In order for a component of this type to be allowed to be used in aerospace applications, the component will have to meet certain minimum mechanical and physical properties, for example, tensile strength, fatigue and corrosion properties. It will also have to meet these properties reliably, i.e. that there should be no substantial scatter in the properties from one component to the next in a production run and between repeated runs.

The component may also be required to have isotropic properties, meaning that, for example, the tensile strength of a particular region of the component is substantially the same in all directions (e.g., the tensile strength or other property varies by 2% or less in any given direction). Other mechanical properties of the component will also be required to be similarly isotropic. In order to attain good isotropic properties, the microstructure of the component needs to be as uniform as possible. Thus, any elongation of the grains needs to be avoided as far as possible, and the size of the grains needs to be as uniform as possible. The distribution of microstructural features such as residual porosity, precipitates and other strengthening features need to be as uniform as possible too.

There are commonly also restrictions on levels of internal defects, for example, such as cracks, porosity, coarse carbides, etc., as well as permitted levels of impurities.

Many engineering parts, and particularly prototypes, are starting to be made using AM or PM. However, it has been found that the AM/PM products typically show wider scatter in terms of mechanical properties than wrought alloy components because of process variation that is inherent in the AM/PM systems.

All of the AM/PM processes generally rely on heat being applied to a powder, e.g., a metal powder, to cause particles of the powder to sinter to neighbouring particles. The sintering results in necks of material being formed that join one particle to the next where they contact. This necking bonds the particles together into a three dimensional network of particles to create a three dimensional form or body. The as built sintered body will also usually comprise a reasonable amount of porosity in the form of interstitial spaces between the joined particles.

If the desired use of the component can tolerate a level of porosity in the component, then the sintered body can then be used in its as built form if the amount of porosity in the component can be tolerated. Alternatively, the sintered body can be used as a preform for a subsequent processing step, e.g., in a densification step such as forging, to remove some or all of the porosity and/or to further consolidate the material. However, forging can result in elongation of the grain structure as a result of material flow.

In many cases the material of a preform can be sintered or sintered and forged to produce a body with substantially the net shape of the final component. In other processes, the sintering can make a material, e.g., in billet form, that can then be used in a forming process to produce a component in its final desired dimensions, for example, via a stamping, extrusion or forging process.

Figure 5:
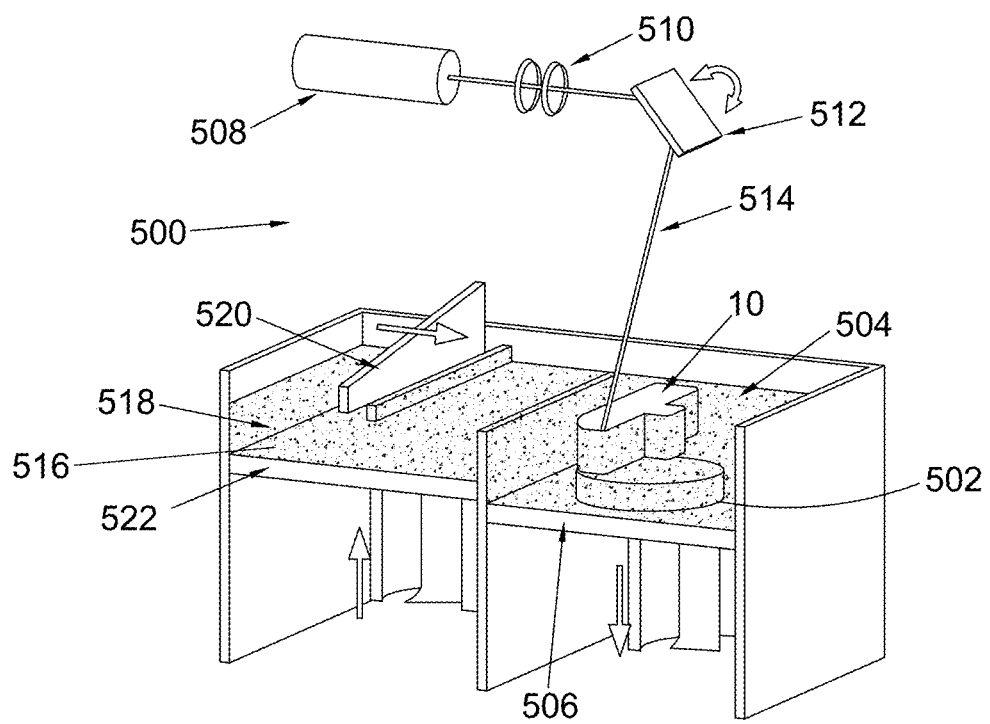
FIG. 5 is an illustration of an apparatus for a laser bed fabrication process (LBFP)

In situations where the sintering process is used to create a sintered body that provides a preform for a subsequent densification process, the sintering may be performed in moulds to create a three dimensional form approaching the net shape of the final product dimensions. One such technique is gravity sintering where powder is poured into a mould and subsequently vibrated to densify the powder. The densified powder is then heated in a furnace to sinter the particles together. Another technique is a low temperature consolidation process followed by sintering in a furnace. The consolidation tool may comprise multiple dies to provide profiling in the preform. In other techniques, lasers may be used to provide the heat locally to sinter the particles together. For example, as depicted in FIG. 5, in laser powder bed fabrication techniques a laser may be directed through a bed of powder to print the three dimensional shape of the preform.

Such preform production methods offer particular advantages with the manufacture of engineering parts that are intended to be used in demanding conditions, especially for low aspect components. In particular, when they are combined with a Field Assisted Sintering Technique (FAST) process, they have been found to produce components with reduced scatter in terms of mechanical and other properties, leading to reliable mechanical strength, fatigue and corrosion properties, etc., that can enable the components to satisfy aerospace regulations.

Figure 3:
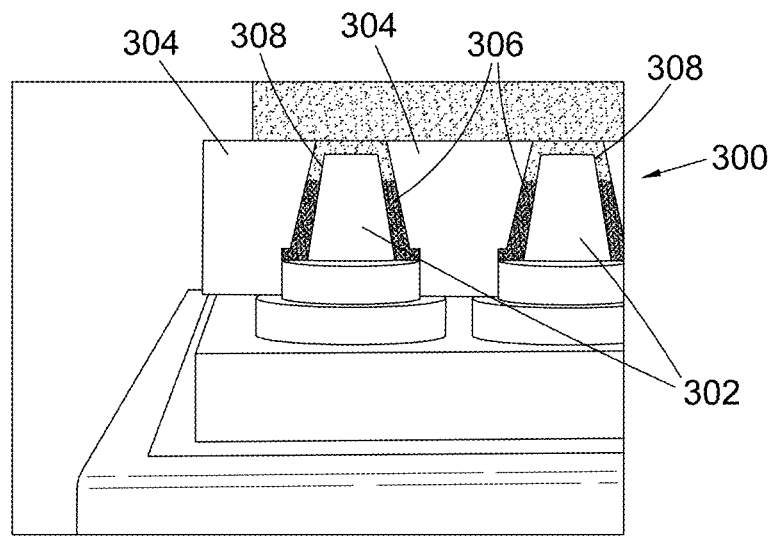
FIG. 3 is a representation of powder filling a mould for a gravity sintering process. In the example the powder is for the production of high porosity bronze filters.

Gravity sintering is a mature process, often used for the manufacture of bronze filters, e.g., as shown in FIG. 3. However, it can also be used to produce other complex shaped preforms, in particular rotational parts, for example, gear preforms, in a similar fashion.

The gravity sintering process comprises pouring powder particles into machined moulds. Graphite moulds are often used for gravity sintering. To avoid carbon pick up, a thin layer of alumina can be applied to the working surfaces of the mould. Alternatively ceramic moulds can be used. The moulds are generally quite simple in terms of construction, for example, comprising two mould parts which are placed together and then heated in a furnace. This is in contrast to some of the multi-part consolidation die arrangements that are sometimes used to compress powder particles.

Figure 4:
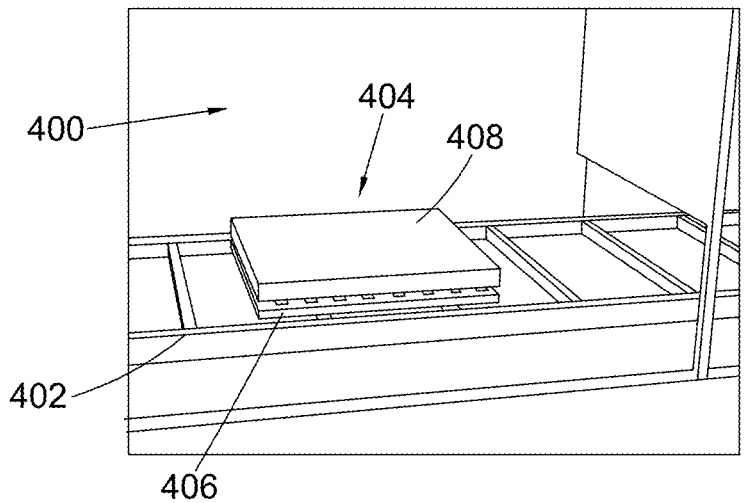
FIG. 4 is an illustration of moulds filled with powder going through a controlled temperature sintering operation.

In the present disclosure, the as-filled density of the gravity sintering moulds can be increased by vibrating the moulds on a vibrating stand prior to sintering. By optimizing the spherical particle size and particle size distribution, the tap density can reach 60-65% of theoretical density. The sintering temperature and sintering time, for example, in a furnace as shown in FIG. 4, are selected to initiate the necking between the particles. This can increase the density to ~80% of theoretical and provides good shape that is close to the intended final dimensions of the component. The resulting preforms are able to be handled relatively easily at this density, and so can be transferred into another apparatus, such as a forging apparatus, a HIPping machine or, as in the proposed method, a FAST apparatus.

An advantage of using a laser based sintering fabrication (LBSF) process as in FIG. 5 is that the density of the preform can be adjusted, for example, by adjusting the laser parameters. The target density of the preform can range from 70 to 95% of theoretical, for example, within 75 to 93%, optionally 80%±3%, and the laser parameters of the LBSF set accordingly. As will be described, there are advantages for varying the density of the preform to help with the consolidation and sintering during the subsequent FAST process.

If the laser bed fabrication process (LBFP) parameters are optimized to achieve an as built density of 80% of theoretical, then that can result in preforms with an arrangement of interconnected porosity that is particularly beneficial for the FAST processing. While that may be a target density in some cases, other densities in the range 70-95% may provide useful preforms that can be used in the FAST process.

When using a LBFP process, care needs to be taken that the re-used powder in the powder bed does not become contaminated with impurities, as this can lead to impurities working their way into the material of the component.

A gravity sintering process tends to produce an as built product having an even density. However, it would be possible to use gravity sintering to produce parts of a preform with different levels of porosity that can then be assembled together prior to applying the FAST process.

FAST (sometimes referred to as Plasma Activated Sintering (PAS) or Spark Plasma Sintering (SPS)) uses a combination of high electrical current and pressure to sinter and densify a powder product. Typically a low voltage, direct current is passed between electrically conductive dies of the pressing tool. This can generate high currents through powdered metals. Simultaneously pressure is applied to the material between the conductive dies.

FAST is similar to a HIP process except that the way the heat is produced and transmitted to the sintering material is different. For example, a metal powder within the FAST tooling will be electrically conductive and so energy from the electrical current is dissipated directly within the sample as a result of Joule heating. In a HIP process, heat is usually provided externally.

In the FAST process, the two electrodes can have die surfaces in the form of moulds shaped to the intended net shape of the final component, optionally with some machining allowance (for example, with a 2% or less machining allowance). The electrodes are able to apply pressure to the preform at the same time as applying the high electrical current, thereby assisting the sintering process and consolidating the preform to full theoretical density (for example, within 1%).

In FIG. 3, a mould arrangement 300 for a gravity sintering process is shown in cross-section to illustrate a male mould portion 302 and a female mould portion 304 which have been assembled together and filled with a powdered material 306.

In the illustration, the mould arrangement 300 is provided to form two or more conical filters, but this is merely exemplary and arrangements for making other components and other numbers of components are envisaged herein. In particular, the component may comprise one which has a lower aspect ratio than the ones shown. For example, the component may comprise a rotational part having a more disc like configuration, e.g., a gear 104, 110; 200 as described above.

In a gravity sintering process, such as FIG. 3, the powdered material 306 is fed from above into the assembled male and female mould portions 302, 304 to fill the die cavity 308 defined between them. The mould portions, instead of being a male mould portion 302 and a female mould portion 304 may comprise two generally concave mould portions which define opposite sides of a component that are pushed together to form a mould cavity 308, the mould cavity 308 having a shape corresponding to the shape of the intended as built sintered body.

In the example of FIG. 3, the component is a bronze filter. Other powdered materials can be sintered in a gravity sintering process. For example, high strength alloys can be sintered by this process, as well as other metallic powders suitable for demanding applications like for gears in a gearbox.

The particles of the powdered material 306 can be consolidated initially prior to sintering in a number of ways, for example, through vibration such as from a vibrating plate, or through a compaction process such as when powdered material is compressed between two or more dies. This can assist with raising the initial density prior to sintering in a mould arrangement 300 and help to remove potential defects in the packing of the powder that might form cracks in the final component. The desired initial density after vibration treatment might be 60-65% of theoretical density for the material.

FIG. 4 shows an example of a furnace 400, having a conveyor 402. A moulding arrangement 404 comprising a lower die 406 and an upper die 408 which define a moulding cavity filled with powdered material (not visible in the figure) is transported through the furnace 400 on the conveyor 402 and heated. The heat causes the particles of powdered material to sinter together, forming necks of material linking the particles together to form a three dimensional sintered body.

FIG. 5 shows an apparatus 500 for LBFP. The apparatus 500 comprises a first powder bed 502 located in a first tank 504 which is provided with an adjustable platform 506 for a base. The adjustable platform 506 is used to gradually move the preform 10 downwards as it is built up as a series of sintered layers. A laser apparatus 508, with lenses 510 and an adjustable X-Y scanning mirror 512 is provided to direct a laser beam 514 into the first powder bed 502 and at the top of the sintered preform 10 which is being built. The laser beam 514 is used to sinter the powder particles in the upper part of the powder bed 502 into a particular shaped layer. Once a layer has been built, fresh powder from a second powder bed 516 contained in a neighbouring second tank 518 is swept across the top of the sintered preform 10 by a re-coater arm 520, ready for the laser beam 514 to sinter the next layer in situ. The second powder bed 516 is provided with an adjustable platform 522 in the base of the second tank 518 to gradually raise the level of the powder in the second powder bed 516 as the powdered material is swept across to the first powder bed 502 and sintered by the laser beam 514 to the top of the preform 10. Once the complete sintered preform 10 has been built up from a plurality of layers, the preform 10 can be removed from the first tank 504.

Figure 6:
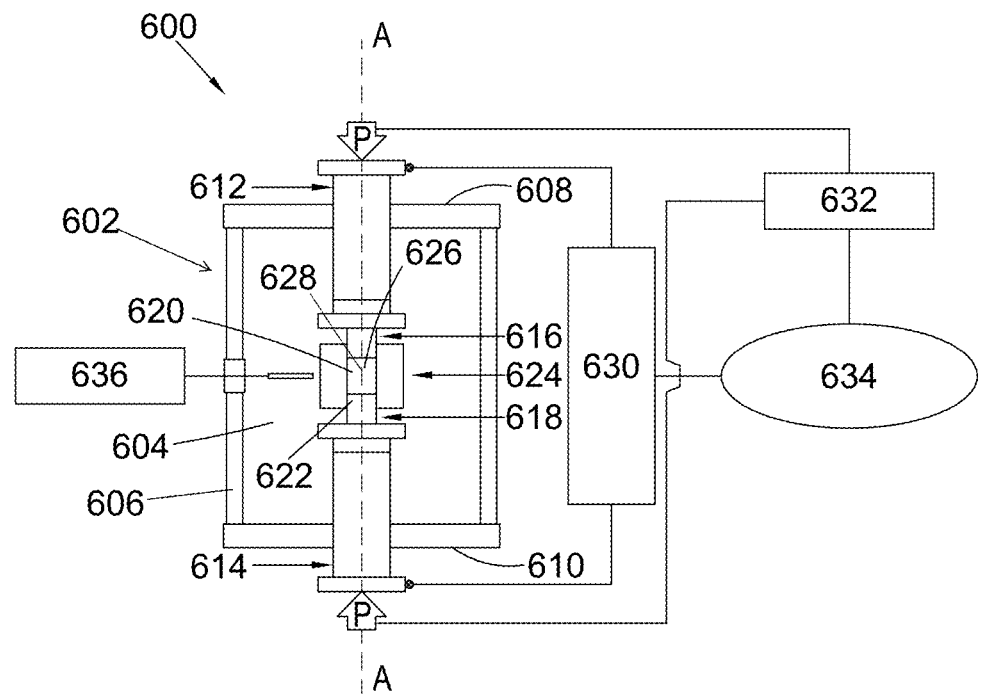
FIG. 6 is a schematic representation of a Field Activated Sintering Technique (FAST) apparatus (also known as Plasma Activated Sintering (PAS) or Spark Plasma Sintering (SPS) apparatus)

FIG. 6 shows a schematic representation of a FAST apparatus. The apparatus 600 comprises a furnace 602, which may have a furnace chamber 604 provided by a cylindrical wall 606 closed off at its ends by upper and lower plates 608, 610. Arranged centrally within the furnace chamber 604, an upper electrode 612 may project through the upper plate 608 along a central axis A-A towards a lower electrode 614 which projects through the lower plate 610.

Mounted on the internal ends of the upper and lower electrodes 612, 614 are an upper punch 616 and a lower punch 618 respectively. The upper and lower punches 616, 618 may be formed with a profiled die surface 620, 622 respectively each of which has been machined to correspond to one half of the intended net shape of the final component. Whilst the die surfaces 620, 622 in the depicted embodiment are profiled, it is possible that at least one of the die surfaces 620, 622 may comprise a flat or relatively flat surface.

The upper punch 616 and lower punch 618 are electrically conductive members. They may comprise a metal or carbon material.

The upper and lower punches 616, 618 are arranged to move axially towards the centre of the furnace chamber 604 within a cylindrical die 624. The cylindrical die 624 may comprise a single piece die or may be a multi-piece arrangement of dies.

The powder material 626 is loaded into a mould cavity 628 defined by the cylindrical die 624 and the die surfaces 620, 622 of the upper and lower punches 616, 618. Thus the height of the die cavity in the final component may be set by the upper profiled die surface 620 of the upper punch 616 and the lower profiled die surface 622 of the lower punch 618.

In conventional FAST apparatus, the powder material 626 is loaded into the die cavity 628 as a powder from a hopper arranged above the tooling. In the proposed method, the powdered material 626 is loaded as a pre-shaped body, i.e. as a preform, which has been previously sintered. In other words, the method comprises a two-stage sintering process to produce the net shape or near net shape product.

In particular, in the proposed method the preform is pre-sintered and consolidated to desired levels of density to improve the sintering during the FAST process. The as built (pre-sintered) preform has a density of 70-95% of the theoretical (100%) density of the material. Optionally it has a density of 75-90% of the theoretical density of the material. A target density may be in the range of 80-85% of the theoretical density, optionally 80-82%.

The upper and lower electrodes 612, 614 are connected to an electrical supply 630, for example, a DC supply or DC generator. The voltage from the electrical supply 630 may be provided in the form of DC voltage pulses to generate pulses of current within the powdered material 626. The pulse profile and duration may be adjusted to promote a given level of sintering.

Pressure P may be applied by a pressure supply 632 to the outer ends of the upper and lower electrodes 612, 614 using mechanical pressure arrangements, for example, through oil pressure or pneumatic systems and associated rams (not shown).

A controller 634, which may be a computerised system, may be provided to control the electrical supply 630 and the pressure supply 632, as well as other aspects of the apparatus 600. For example, the furnace chamber 604 may be evacuated or contain an inert atmosphere, and the controller 634 may control the vacuum within the furnace chamber 604 or the flow of inert gas into and/or out of the furnace chamber 604.

One or more thermocouples 636 may be arranged to monitor the temperature of the cylindrical die 624, and hence the powdered material 626 during the FAST process. Other forms of temperature sensor could also be used, for example, axial/radial pyrometers. Temperatures inside the die cavity may reach, for example 2400° C., and so the temperature sensors, depending on their location, may need to be suitable to operate at such temperatures.

The preforms made by the above described AM/PM processes have interconnected particles and may have associated porosity of around 20%±10%, or ±5%. The electrical current in the FAST process is able to travel through the regions where the particles have created necks, generating heat at the particle surfaces. The heating can be applied at a very high rate, for example, greater than 500° C./minute, more usually greater than 750° C./minute, often greater than 950° C./minute, for example, as high as 1000° C./minute. This can be achieved with relatively low voltages (for example, around 10 V±5V, though larger voltages can also be used) producing relatively high currents (for example, around 1 to 10 kA, or more as desired). The voltage is usually provided as pulses, for example, having a pulse duration of seconds or portions of a second, e.g., in the order of a few milliseconds. The pattern and profile of the pulses may be set by the controller 534 to optimise the FAST process.

Figure 7:
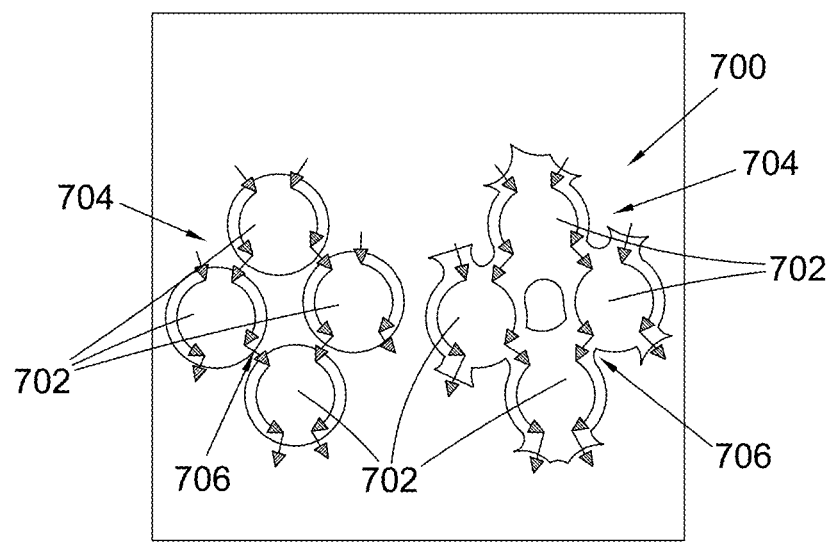
FIG. 7 is a schematic illustration of particles of a powdered material being sintered under Joule heating in a FAST process.

FIG. 7 provides a representation of a conventional FAST process 700 with particles 702 of powdered material 704 being sintered together to form a three dimensional network of linked particles 702 defining a three dimensional sintered body. Initially when a potential is provided across the upper and lower electrodes 612, 614, there will be plasma heating as sparks jump between separated particles 702 and across oxide films. As the heat builds, the particles 702 begin to sinter and any oxide films start to breakdown. The resistance across the particles 702 begins to fall and the current rises. Once necks 706 begin to form between the particles 702, Joule heating can take over and continues to heat the powdered material 704. In the proposed method, the necks 706 are already formed in the AM/PM pre-sintering process.

The voltage, and for example, the pattern/duration of pulses, may be varied during the FAST process. The contact area between the particles 702 will be dependent on the compressibility of the particles 702 and so will be dependent to an extent on the pressure being applied by the upper and lower punches 616, 618. The compressibility of the particles 702 will also be a function of a temperature, the materials usually becoming more ductile as they approach their melting points. Thus during the FAST process, as the temperature of the material increases, there will be an increase in surface contact, allowing more current to flow. There may be an effect from the breaking through of an oxide layer, lowering the resistance across the powdered material 704. Heat in the particles 702 will also raise their internal resistance. In addition, the powdered material 704 will generally consolidate and lose porosity, as gaps between particles 702, cracks and other defects are removed from the sintered material. This will act to reduce the resistance posed by the sintered material.

The FAST process may be seen to work best when the powders are not too compacted, as the contact area between particles 702 of the powder is smaller at that point resulting in greater resistance for the current flowing through the contact points and greater heat-up rates for the FAST treatment. A faster rate of heating to the sintering temperature means less grain growth and a smaller overall grain size in the final component.

The Joule heating is applied to the particles 702 in a protective atmosphere which can assist to reduce surface oxidation. This can be in the form of a vacuum or inert gas atmosphere. The Joule heating promotes the consolidation process. In addition, large pressures are applied between the upper and lower profiled die surfaces 620, 622, e.g., in the height or Z-direction of the preform. The combination of rapid heating rate and applied pressure is able to produce fully dense (e.g., >99% of theoretical density, and optionally even >95.5% of theoretical), high purity homogenous materials with very fine grain size.

A FAST process can be used to produce ceramic components as well as metallic. In such situations, heating may be provided by electrical current running through the cylindrical die 624 of the die cavity 628.

A typical FAST cycle time is about 10 to 30 minutes, e.g., around 15 minutes±5 minutes, versus hours typically used in a hot pressing or HIP.

Once the component has been fully densified, it may be rapidly cooled, for example, quenched using a flow of gases, with cooling rates comparable with the magnitude of the heating rates or faster. Grain growth can be minimised with such rapid cooling.

Figure 8:
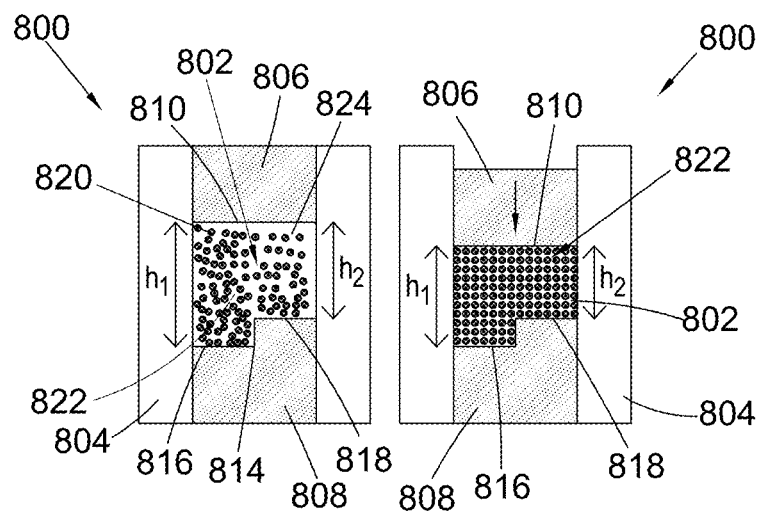
FIG. 8 is a schematic representation of a FAST tooling die showing variation in preform density for a component having different height regions.

FIG. 8 illustrates schematically a tooling arrangement 800 for a FAST machine. A die cavity 802 is defined by inner surfaces of a cylindrical die 804, an upper die 806 and a lower die 808. The upper die 806 is formed with a flat upper die surface 810. The lower die 812 is formed with a profiled lower die surface 814 having a first region 816 defining a first die separation $h_1$ between the upper die 806 and the lower die 812 and a second region 818 defining a second die separation $h_2$ between the upper die 806 and the lower die 812. The second die separation $h_2$ is different to the first die separation $h_1$. The first die separation $h_1$ provides a space in the die cavity 802 which is taller than the space provided by the second die separation $h_2$. A third region of the lower die 812 could also be provided, which could define a further (third) die separation between the upper die 806 and the lower die 812 that is different to the second die separation $h_2$ defined by the second region 818. In some instances the third die separation defined by the third region may be the same as the first die separation $h_1$ defined by the first region 816, for example, where the component to be formed comprises a hub 202 and a rim 204 spaced apart by web 206 as shown in FIG. 2. The third region may be displaced axially with respect to the first region 816 and/or the second region 818.

The left hand side of FIG. 8 shows the tooling arrangement 800 prior to FAST processing and the right hand side of FIG. 8 shows the tooling arrangement 800 at a late stage of the FAST process, with the upper die 806 depressed towards the lower die 808.

As shown in the left hand side of FIG. 8, the density of a preform 822 may vary across the die cavity 802. The first region 816 defining the larger first die separation $h_1$ is provided with a first portion 820 of the preform 822 having a first density and a second portion 824 of the preform 822 having a second density different to the first density, in particular having a lower density than the first portion 820 which has a higher density.

Where a third region is provided defining a larger die separation than that defined by the second region 818, a third portion of the preform may be provided in the third region of the die cavity 802 and that may have a higher density than the second portion 824. It may have the same density as the first portion where the die separation defined by the first and third regions corresponds.

The method is well suited to the manufacture of low aspect components. These are components where a dimension in a first direction, for example, a height or thickness direction (Z-direction, which might also be an axial direction), is substantially less than a dimension in the other directions perpendicular to the first direction, for example, a diameter or width direction (X/Y-direction, which might also be a radial direction).

In the case of rotational parts, for example, the aspect ratio may be seen as the height (H) of the component divided by the diameter (D) of the component, i.e., H/D. A "low profile rotational part" would indicate a rotational part having a disc like shape, for example. A low aspect ratio might indicate a component having a maximum height in an axial direction which is less than half the diameter measurement.

One example of components that can be produced by the proposed method are gears. These may comprise (not exhaustively) wheel gears, planet gears, bevel gears, ring and flanged ring gears. However other components for demanding aerospace applications are also envisaged and included within the scope of this specification. This could extend to any disc-shaped component that has dimensions which can fit within the dies of a FAST apparatus. While the technique is particularly attractive for rotational parts, it could also extend to non-rotational parts.

Current commercial FAST machines have been developed to apply high voltages over electrode die gaps of up to 40 mm or so. Diameter measurements may be up to 200 mm or thereabouts. Hence components with low aspect ratios of less than 0.5 are attractive for this method, for example components with aspect ratios less than 0.4, less than 0.3 or even less than 0.25. In one example, the aspect ratio may be 0.2 or less. However, the present method is not limited to these sizes and components of larger dimensions could be produced in larger furnaces if desired.

In broad terms, the proposed method can be seen as a combination AM or PM process and a FAST process. The AM/PM process is used to make the preform (pre-sinter it) which is then used in the FAST process in order to fully densify the material of the component and provide a near net shape component configuration.

Near net shape configuration may be seen as the component having dimensions which are within 2% of the intended final component dimensions, or where possible, within 1% of the intended final component dimensions.

The density of the preform can vary from 70 to 95% of the theoretical density of the material from which it is formed, optionally 75-92% of the theoretical density. Improved properties and processing advantages can be achieved when the density of the preform is greater than 80% of the theoretical density and less than 90% of the theoretical density. In addition, a preform having a density in this range should exhibit dimensional stability without significant shrinkage and at the same time a mechanical strength which is sufficient for handling.

The density of the sintered and consolidated product from the FAST process should be greater than 97% of the theoretical density, may be greater than 98% of the theoretical density and optionally is 99% of the theoretical density, or closer to 100%. The FAST process is beneficial in closing up any voids or similar defects present in the preform following the pre-sinter process.

The proposed method can be seen in one aspect to utilise a combination of AM/PM and FAST processes to achieve fully dense, ultra-high strength steels, with net or near net shape, having a high purity, a uniform distribution of alloying elements, a small grain size and uniform grain shape, a small carbide size and a uniform carbide distribution.

The proposed method can also be seen in another aspect as manufacturing a component utilising a pre-sintered preform having an optimized density distribution ranging from 70 to 95% of theoretical density (e.g., in a range of 80-90%) for a FAST process second sinter such that the resultant component comprises a fully densified material and provides near net shape component configuration.

An example of components that can be produced by the proposed method are gears. These may comprise (not exhaustively) wheel gears, planet gears, bevel gears, ring and flanged ring gears. However other components for demanding aerospace applications are also envisaged and included within the scope of the specification, such as disc-shaped plates, covers, cases, rotors, washers, etc.

Examples of high strength alloys which are particularly suited for AM/PM and FAST processing are high carbon alloys. These alloys are prone to solidification cracking in conventional processing. They may also be weldable.

For AM fusion, usually low to medium carbon content alloys are recommended. These might include M300, CarTech™ Ferrium® C61™, AerMet® 100 ALLOY, AerMet® 340 ALLOY. These alloys would also be suitable in the proposed method as cracks resulting from the solidification of the AM preform can be removed during the FAST process.

Since PM processing involves solid state diffusion there is no limitation on using high carbon steels. Examples of high strength alloys for PM and FAST processing include CRUCIBLE CPM® 154, 440C, X120CrMoVN19-2 (Aubert &Duval APZ10), etc.

A FAST process can be used with a wide variety of powders with different morphology. It can also be used for powdered materials comprising whisks or chopped fibres, woven composites or any combinations thereof. Materials may include metallic and non-metallic feedstock (e.g., ceramics, metal matrix and ceramic matrix composites, intermetallics). For example, materials like boron carbide may be used. Experiments with boron carbide have produced fully dense 140 mm diameter×10 mm specimens and the cycle time was less than 30 minutes. For metal powders the typical FAST process cycle time would be around 15 minutes or less.

Non spherical shaped powders with low compressibility can be easily consolidated because of the FAST process' high heating rate, its vacuum or other protective atmosphere, and its high (~2400° C.) temperature and high pressure capabilities. High carbon content steels as well as other "non-weldable" alloys (such as, for example, Al 6061, Al 7075, IN 100) cannot be AM fused without cracking. The cracking is extended to surfaces and this is why they can't be healed during HIP but by comparison they can be closed during a FAST process.

The current commercial FAST systems are capable of producing up to twelve 200 mm diameter and 12 mm thick fully dense components per a 15-20 minutes cycle while maintaining relatively tight tolerances. Larger batch sizes could be produced in larger FAST systems.

Figure 9:
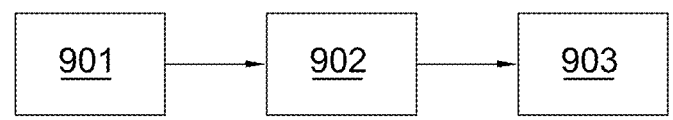
FIG. 9 is a flow diagram illustrating the steps involved in a method of manufacturing components according to embodiments of the present disclosure.

FIG. 9 illustrates a method of manufacturing a component in accordance with embodiments of the present disclosure. At step 901 a preform is made from a powdered material. AM (e.g. LBFP) may be used to form the preform. Alternatively, PM (e.g. low temperature consolidation or gravity sintering) may be used to form the preform. The preform manufactured at step 901 may have a density in a range from 70 to 95% of the theoretical density of the material, optionally 75-92% of the theoretical density, even further optionally the density of the preform is greater than 80% of theoretical and less than 90% of theoretical.

At step 902 the preform formed at step 901 is sintered using a FAST technique to produce the component. The component produced from the FAST technique has a density of greater than 97% of the theoretical density of the material, optionally greater than 98% of the theoretical density and optionally is 99% of the theoretical density or closer to 100% of the theoretical density.

At step 903, when the component is near but not at the final, desired net shape, may optionally be machined to obtain the final part dimensions (i.e the final net shape of the component). Alternatively, the machining step 903 may not be required as the combination of step 901 and step 902 may produce the component with the desired final part dimensions (i.e. the desired net shape).

Advantages of manufacturing low aspect aerospace components by the proposed method include cost reduction and an improved buy-to-fly ratio. It is able to produce near net shape gears with minimum machining allowances. Cost reduction can result from not only a significantly reduced cycle time but also the building time of the pre-sintered preform (e.g., having a density in the region of 80%) is much reduced compared to AM/PM processing to reach higher densities. The costs are significantly lower than preforms with >99% as-built density. The resulting component may also have improved material properties. A pre-sintered preform (for example, an as-built 80% density AM sintered body) requires significantly lower laser energy density than a higher density product. The lower laser energy density will not cause the same level of grain coarsening as in, for example, the 99% as-built density AM components. Moreover, the AM plus FAST or PM plus FAST processing can provide a more homogenous microstructure compared to PM/AM plus forge process, which produces elongated grains in the forging flow direction. The component can also benefit from high purity of final material. The combination of interconnected porosity and reduction of particle surface oxidation during the FAST process produces a clean microstructure with fine grain size, small carbides and uniform carbide distribution. This in turn provides superior fatigue and fracture toughness that are important for components such as aerospace gears applications.

Thus as can be seen from the above discussion, the proposed method, at least as described in the illustrated embodiments, is able to produce homogenous, high purity, ultra-strength alloy components with very fine grain size. As such it is targeted for components requiring superior high cycle fatigue and fracture toughness properties. The proposed method further enables manufacturing of net or near net shape components with minimum machining allowance.

The invention claimed is:

1. A method of manufacturing a component comprising:
    making a preform from a powdered material, the preform having a density in a range from 70 to 95% of theoretical density of the material; and
    sintering the preform using a Field Assisted Sintering Technique (FAST) process to produce a component having a density of greater than 97% of the theoretical density of the material;
    wherein the FAST process comprises applying an electric potential across the preform via opposed conductive dies which are arranged to apply pressure simultaneously in order to consolidate the preform; and
    wherein the dies for the FAST process are configured to produce a component with a machining allowance of 2% or less;
    wherein the preform is made from gravity sintering in ceramic or graphite moulds.

2. The method as claimed in claim 1, wherein the dies each comprise a die surface and at least one of the die surfaces has been profiled so as to vary in height across the die surface and thereby provide a die cavity defined by a first die separation and a second die separation that is different to the first die separation, and wherein the preform is made with a first portion having a first density in the first die separation prior to the FAST process and a second portion having a second density different to the first density in the second die separation prior to the FAST process.

3. The method as claimed in claim 2, wherein the die cavity is further defined by a third die separation which is different to the second die separation, and the preform is made with a third portion having a third density which is different to the second density prior to the FAST process, and optionally wherein the third die separation is the same as the first die separation (±3%) and the third density is the same as the first density (±3%) prior to the FAST process.

4. The method as claimed in claim 2, wherein the first die separation is taller than the second die separation and the preform is made with a first portion having a higher density than the second portion prior to the FAST process, and optionally wherein a (the) third die separation is taller than the second die separation and the preform is made with a third density which is a higher density than the second portion prior to the FAST process.

5. The method as claimed in claim 4, wherein the component comprises a rotational part, optionally a gear, having a hub which is formed in the first die separation, and a web which is formed in the second die separation, and optionally a rim which is formed in a (the) third die separation.

6. The method as claimed in claim 1, wherein the component comprises a rotational part having an aspect ratio of 0.5 or less, where the aspect ratio is defined as a height of the component (H) divided by its diameter (D), the height being measured perpendicular to the diameter.

7. The method as claimed in claim 1, wherein the FAST process is conducted until the component has reached a density of at least 99% of the theoretical density for the material.

8. The method as claimed in claim 1, wherein the powdered material is a powdered metal material, optionally a weldable metal material.

9. The method as claimed in claim 1, wherein the powdered material comprises powder having a non-spherical morphology.

10. The method of claim 9, wherein the material does not comprise a lubricant.

11. The method as claimed in claim 1, wherein the component is one of a wheel gear, a planet gear, a bevel gear, a ring gear and a flanged ring gear.

* * * * *